United States Patent
Vossler

[19]

[11] Patent Number: 6,115,177
[45] Date of Patent: Sep. 5, 2000

[54] INTERACTIVE 3-D VIEWING GLASSES

[75] Inventor: Stephen P. Vossler, Sioux Falls, S. Dak.

[73] Assignee: Gateway, Inc., N. Sioux City, S. Dak.

[21] Appl. No.: 09/286,977

[22] Filed: Apr. 6, 1999

[51] Int. Cl.[7] .......................... G02B 27/26; G02B 27/22; G02B 5/30; G02F 1/133
[52] U.S. Cl. .......................... 359/465; 359/462; 359/501; 349/13; 351/49
[58] Field of Search ..................................... 359/465, 462, 359/464, 501; 349/13; 351/49

[56] References Cited

U.S. PATENT DOCUMENTS

| | | | |
|---|---|---|---|
| 4,744,633 | 5/1988 | Sheiman | 350/132 |
| 4,989,954 | 2/1991 | Yokoyama et al. | 359/465 |
| 5,198,928 | 3/1993 | Chauvin | 359/465 |
| 5,343,313 | 8/1994 | Fergason | 359/630 |
| 5,420,717 | 5/1995 | Tabata | 359/371 |
| 5,457,554 | 10/1995 | Faris | 359/65 |
| 5,537,144 | 7/1996 | Faris | 348/58 |
| 5,615,046 | 3/1997 | Gilchrist | 359/464 |
| 5,686,975 | 11/1997 | Lipton | 349/15 |
| 5,691,844 | 11/1997 | Oguchi et al. | 359/465 |
| 5,717,522 | 2/1998 | Hattori et al. | 359/465 |

*Primary Examiner*—Audrey Chang
*Attorney, Agent, or Firm*—Anthony Claiborne

[57] ABSTRACT

An image viewing system to permit viewing of three-dimensional images, wherein users wear a pair of eyeglasses to view displayed images. The pair of eyeglasses include lenses having LCD polarizing filters and a LCD controlling unit configured to adjust the polarization of the lenses based upon the orientation of the glasses. A sensing unit, located on the glasses, monitors the orientation of the glasses and when the orientation is skewed from a default orientation, the sensing unit notifies the controlling unit of the new orientation. Upon receipt of the new orientation, the controlling unit then initiates a change in the polarization of the LCD filters. Adjustment of the polarization allows users of 3-D viewing glasses to freely adjust head position relative to the displayed images without compromising the integrity of the viewed image.

20 Claims, 6 Drawing Sheets

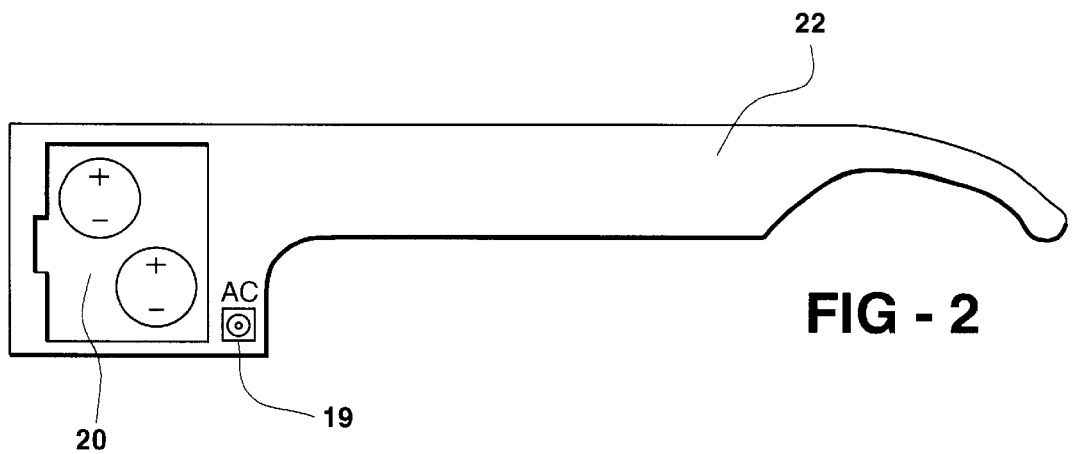
FIG - 2
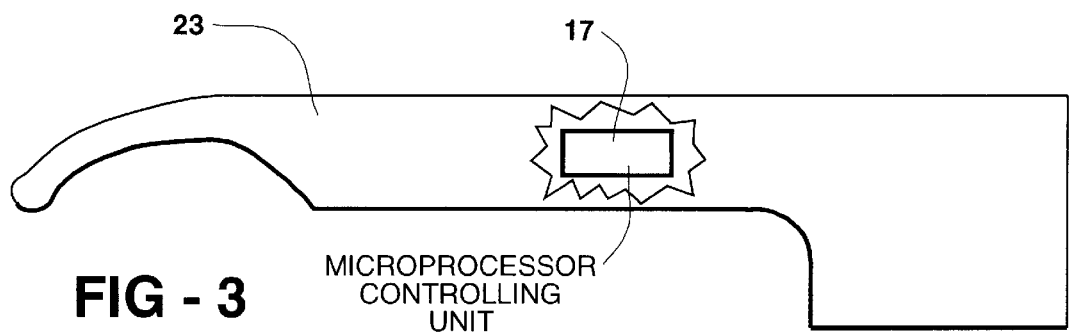
FIG - 3
FIG - 4
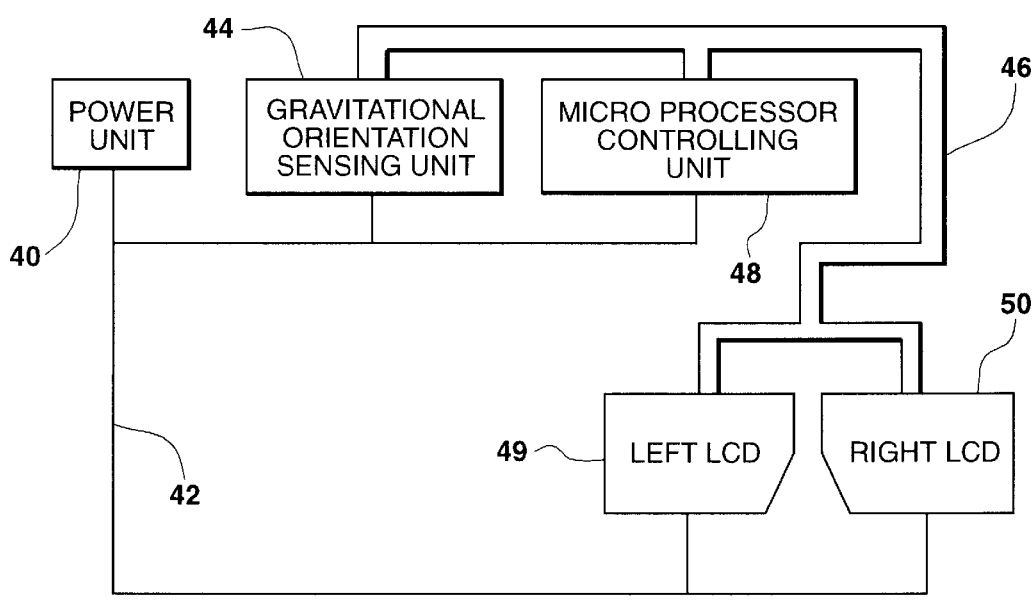

INTERACTIVE 3-D VIEWING GLASSES

FIELD OF THE INVENTION

The present invention generally relates to image viewing systems using polarized light and, more particularly, to image viewing systems, apparatuses, software and methods for correcting distorted images caused by a change in orientation of an image viewing apparatus.

BACKGROUND OF THE INVENTION

The desire for quality three-dimensional viewing capabilities has exploded alongside the expanding area of computers and the subset of computing technology known as 3-D gaming. The science of creating an image system capable of producing the required left and right images necessary for that particular image to be seen three-dimensionally has been refined to a point where the quality available from the images displayed cannot be fully appreciated by the current viewing technology designed to enable a user to see the images in their intended form.

Current technology typically involves using polarized lenses in a set of glasses to isolate the images being viewed by either eye of the user or users. A result of the use of polarized lenses is that the best resolution from a given stereoscopic image occurs when the user assumes a position in which the "horizon line" of the user and the "horizon line" of the image have the same orientation. To further explain, if the user's head was tilted during use, a dual image fading from one polarization (e.g., vertical) to another polarization (e.g., horizontal) will occur.

This dual image fading occurs due to the physics of polarized light. Most light is represented by electromagnetic plane waves which are an incoherent mixture of wavelengths, polarizations, amplitudes and phases. Half of this light energy has a first polarization and the other half has a second polarization. To produce a three-dimensional image, it is necessary to first encode the left image with one polarizing filter, P1, and then encode the right image with another polarizing filter, P2. Someone wishing to view the image in its intended form would be required to wear a pair of passive glasses with the left lens polarized as P1 and the right lens polarized as P2. This will allow the image intended only for the left eye to pass through the left lens and into the eye as well as permitting only what is to be seen by the right eye to pass through the right lens. The effect of this polarization is maximized when the light, originating at the image, coming into the lenses of the glasses travels on a path orthogonal to the flat surface of the lenses. Twisting of the glasses will skew the polarizing filters and in turn skew the image allowed through each lens and into each eye. The result is a distorted image with elements from both the right and left images being let into each eye.

During gaming, a user tends to move his head about while interacting with a 3-D environment. This head movement results in the user viewing distorted images causing the user to lose focus of the intended image and oftentimes view information the opposing gamer intended to keep hidden.

Additional functionality desired from 3-D viewing glasses is the ability to interactively switch between interlaced polarized images. For example, imagine a user is viewing an image based upon light polarized at angle X. The user can readjust the polarization of the 3-D viewing glasses to accept polarized light at angle Y allowing a different image to be seen. The ability to access a multitude of images from one image source enhances the utility of both the image display apparatus and the 3-D viewing glasses. Applications for such an advancement include flight glasses for pilots, enhanced gaming, as well as others.

What is needed is a solution for such an image viewing system capable of adjusting the polarization of an image viewing apparatus to compensate for changes in the orientation of the image viewing apparatus to thereby allow the user to move about freely without concern for image integrity and further capable of limiting image access to the user which it is intended.

SUMMARY OF THE INVENTION

Accordingly, the present invention provides an apparatus comprising at least one polarizing filter, a sensor configured to detect the orientation of the filter and a controller configured to adjust the polarization of the filter in response to the orientation detected by the sensor.

The present invention also provides a system comprising an image generator configured to project an image, at least one polarizing filter configured to receive and filter an image, a sensor configured to detect an orientation of the filter, a controller operably coupled to the sensor and the filter and configured to adjust the polarization of the filter in response to the orientation detected by the sensor.

The present invention further provides a method for adjusting the polarization of the polarizing filter. The method comprises the steps of determining the current orientation of the filter and adjusting the polarization of the filter in response to the current orientation of the filter.

The present invention further provides a computer readable medium tangibly embodying a program of instructions for adjusting the polarization of a polarizing filter by implementing the above described method.

It is an object of the present invention to provide an image viewing system including an image viewing apparatus for correcting image distortion of a displayed image caused by a mismatching of the polarization of the displayed image and the polarization of the image viewing apparatus.

It is another object of the present invention to adjust the polarization of an image viewing apparatus to compensate for changes in the orientation of the image viewing apparatus.

It is another object of the present invention to allow a user of an image viewing apparatus to move about freely without concern for image integrity.

The present invention provides the advantage of allowing a user to enjoy the ability to move his or her head about without compromising image integrity or revealing images not intended to be seen.

BRIEF DESCRIPTION OF DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIG. 2 is a side view of the left arm of the apparatus of FIG. 1 according to a preferred embodiment of the present invention;

FIG. 3 is a side view of the right arm of the apparatus of FIG. 1 according to a preferred embodiment of the present invention;

FIG. 4 is a block diagram of the system depicted in FIG. 1 according to the preferred embodiment of the present invention;

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
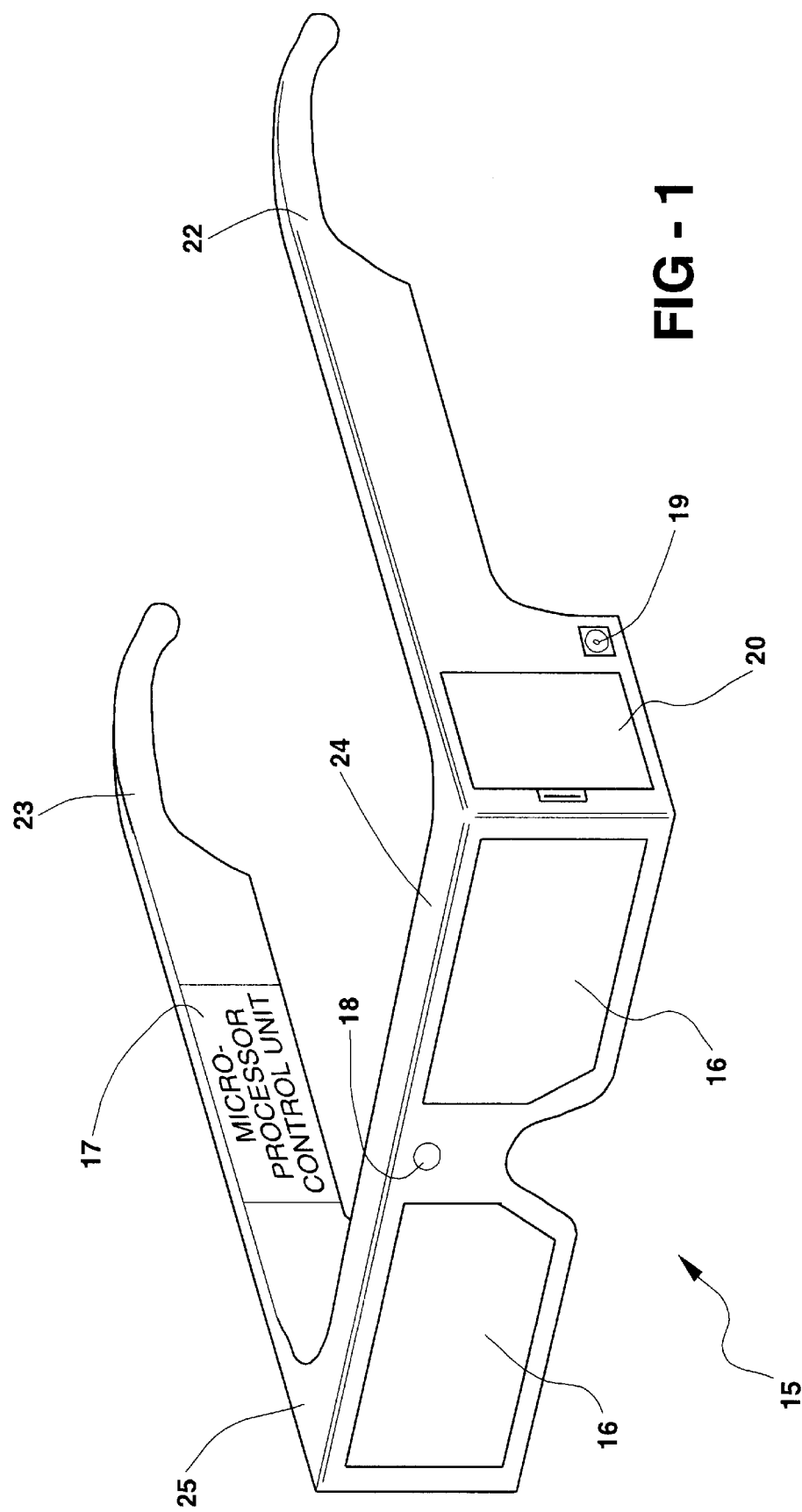
FIG. 1 is a perspective view of an apparatus according to a preferred embodiment of the present invention.

Referring now to FIG. 1, a perspective view of a pair of image viewing glasses 15 according to the preferred embodiment of the present invention is shown. The pair of image viewing glasses 15 detailed herein are built on an eyeglass frame consisting of a left arm 22, a right arm 23, a thin shield 25, and a lens frame comprised of two apertures for holding a set of lenses, and a stabilizing bar 24. The eyeglass frames further comprise a pair of LCD polarizing filters 16, a power source, a sensing unit 18 and a controlling unit 17. The apertures of the lens frame are to house the two LCD polarizing filters 16 therein. The power source, incorporated into one arm of the frame, includes an AC adapter 19, allowing glasses to be powered by a standard wall outlet, and a DC power supply unit 20, enabling the glasses to be powered by DC power sources. Housed in the opposite arm of the eyeglass frame is the controlling unit 17 configured to adjust the polarization of the LCD lenses according to the gravitational orientation of the viewing glasses. The thick part of the lens frames just above the LCD polarizing filters 16, referred to here as the stabilizing bar 24, houses the sensing unit 18 configured to detect the gravitational orientation of the image viewing glasses 15.

Referring now to FIGS. 2 and 3, in which a side view of the left arm and right arm respectively of the apparatus of FIG. 1 according to a preferred embodiment of the present invention are shown. Reference numerals or letters in FIGS. 2 and 3 which are like, similar, or identical to the reference numerals or letters of FIG. 1 indicate like, similar, or identical components or features. The eyeglass frames mentioned above contain a few modifications over conventional eyeglass frames. Similarities in structure are observed in the left and right arms, 22 and 23 respectively, used to position and hold the eyeglasses on the ears. The front view of the glasses, herein referred to as the lens frame, will contain apertures for two lenses, a left and a right. The modifications to the left arm 22 include making it of significant width to allow for a DC unit 20, including batteries, and an AC adapter 19 to be installed. The right arm 23 will have modifications in width, equivalent to that of the left arm 22, allowing for the controlling unit 17 to be contained therein. Another goal of the arm width modification is to aid in preventing any peripheral environmental lighting from hindering the user's view of the LCD polarizing filters 16. The modification of the front of the glasses, the lens frame, includes a widening of the stabilizing bar 24 above the apertures housing the lenses, or LCD polarizing filters 16. One goal of widening this stabilizing bar 24 is to allow room for housing the sensing unit 18 configured to detect the orientation of the image viewing glasses 15 and to signal controlling unit 17 accordingly for any necessary adjustments. Although a preferred embodiment of the present invention includes the controlling unit 17 in one of the arms of the frame of the glasses, let it be understood that alternative embodiments may place the controlling unit 17 in another location such as the lens frame, a part of a computer, or a part of an image displaying device. The back side of the stabilizing bar 24 will encompass a thin shield 25 mounted perpendicular to the front of the eyeglass frame and will be shaped, on its unattached edge, to conform to a user's forehead. This additional thin shield 25 is intended to aid in the prevention of overhead environmental lighting affecting the user's experience.

The lenses of a preferred embodiment of the present invention are to be comprised of LCDs, or LCD polarizing filters 16. LCDs are known in the art as to their functionality in filtering light. The specific type of filtering called for in a preferred embodiment of the present invention is the filtering of polarized light. As is known in the art, one method of viewing images in 3-D is to display the images in duality. That is, one picture is generated for the left eye and the other picture is generated for the right eye with the center of the pictures being distanced 6.5 cm apart, both pictures are then simultaneously displayed. In viewing 3-D images using polarized lighting concepts, the left image would be polarized a certain and distinct way that is separate from the way the image for the right eye is polarized. In this application, the LCD filter covering the right eye would be polarized to allow only the image being produced for the right eye to reach the right eye. The left LCD would be likewise configured allowing the left eye to see only the image intended for it. LCD polarizing filters 16, also known as Liquid Crystal Shutters or Liquid Crystal Pi-Cell devices, are used for their ability to be configured to a certain polarization orientation. Due to the fact that these are active devices, they are the perfect solution for a dynamic image viewing system. Alternate embodiments of the present invention can utilized FEDs (Field Emission Displays) as well as other, similar technologies for the polarizing filters.

Referring now to FIG. 4, a block diagram of the system depicted in FIG. 1 is illustrated according to the preferred embodiment of the present invention. Reference numerals or letters in FIG. 4 which are like, similar, or identical to the reference numerals or letters of FIGS. 1–3 indicate like, similar, or identical components or features. The basic interconnections of power and communication are illustrated in FIG. 4 which enable the operation of the system of FIG. 1. Power unit block 40, such as DC unit 20 or AC unit 19 of FIG. 1, is connected via power supply means 42 such that it provides power to the various components of image viewing glasses 15. Gravitational orientation sensing unit block 44 is connected via communication means 46 to controlling unit block 48. Controlling unit block 48 can be any type of microprocessor capable of accomplishing the tasks defined herein. Controlling unit block 48 is subsequently connected via communication means 46 to left LCD 49 and right LCD 50. Controlling unit block 48 is connected to left LCD 49 and right LCD 50 to enable the adjustment of the polarization of LCDs 49, 50 in response to orientation readings received by the controlling unit block 48 from gravitational orientation unit block 44.

Figure 5:
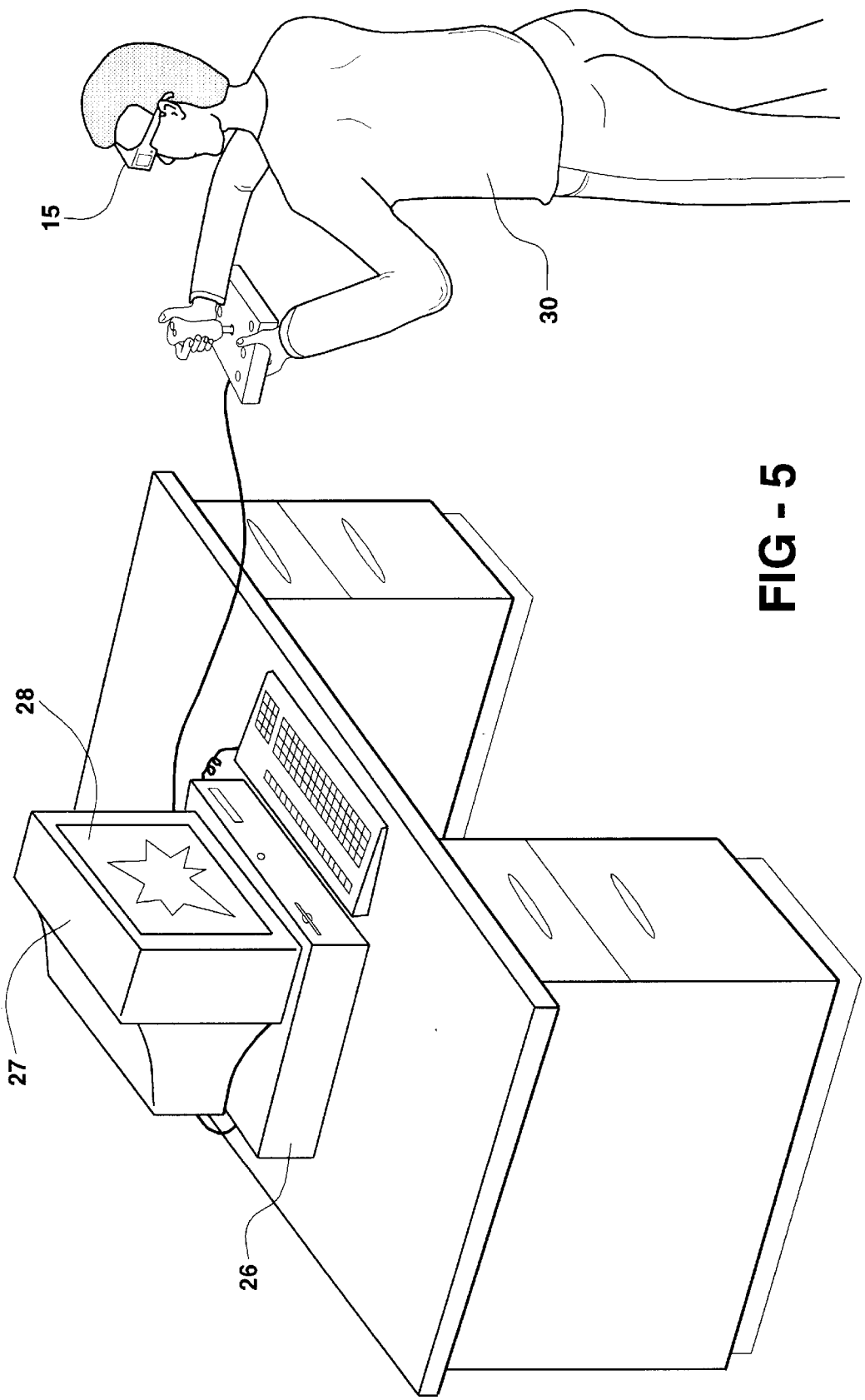
FIG. 5 is a perspective view of a system according to a preferred embodiment of the present invention.

Referring now to FIG. 5, a perspective view of a system according to a preferred embodiment of the present invention is shown. Reference numerals or letters in FIG. 5 which are like, similar, or identical to the reference numerals or letters of FIGS. 1–4 indicate like, similar, or identical components or features. The ideal use of the present invention is to have the apparatus of FIG. 1 operably coupled to an image generating device, which in a preferred embodiment comprises at least one processor 71, memory 73 and/or 74 operably associated with the processor 71, and a display device 85, such as a monitor 27, operably associated with the processor 71 and the memory 73 and/or 74. A computer 26 running 3-D enhanced software coupled with a monitor 27 is the ideal set of partners to practice the image viewing glasses 15 detailed above. The enthusiasm the user 30 incurs while playing a 3-D game no longer prevents the user 30 from correctly seeing the displayed image 28. When the user 30 moves their head in an attempt to introduce body-english or to maintain perspective, the present invention will maintain the appropriate polarization orientation between the image viewing glasses 15 and the displayed image 28 that will keep the user 30 in constant focus. Typical image generators include, but are not limited to, computers coupled to displays, televisions, and the like.

Figure 6:
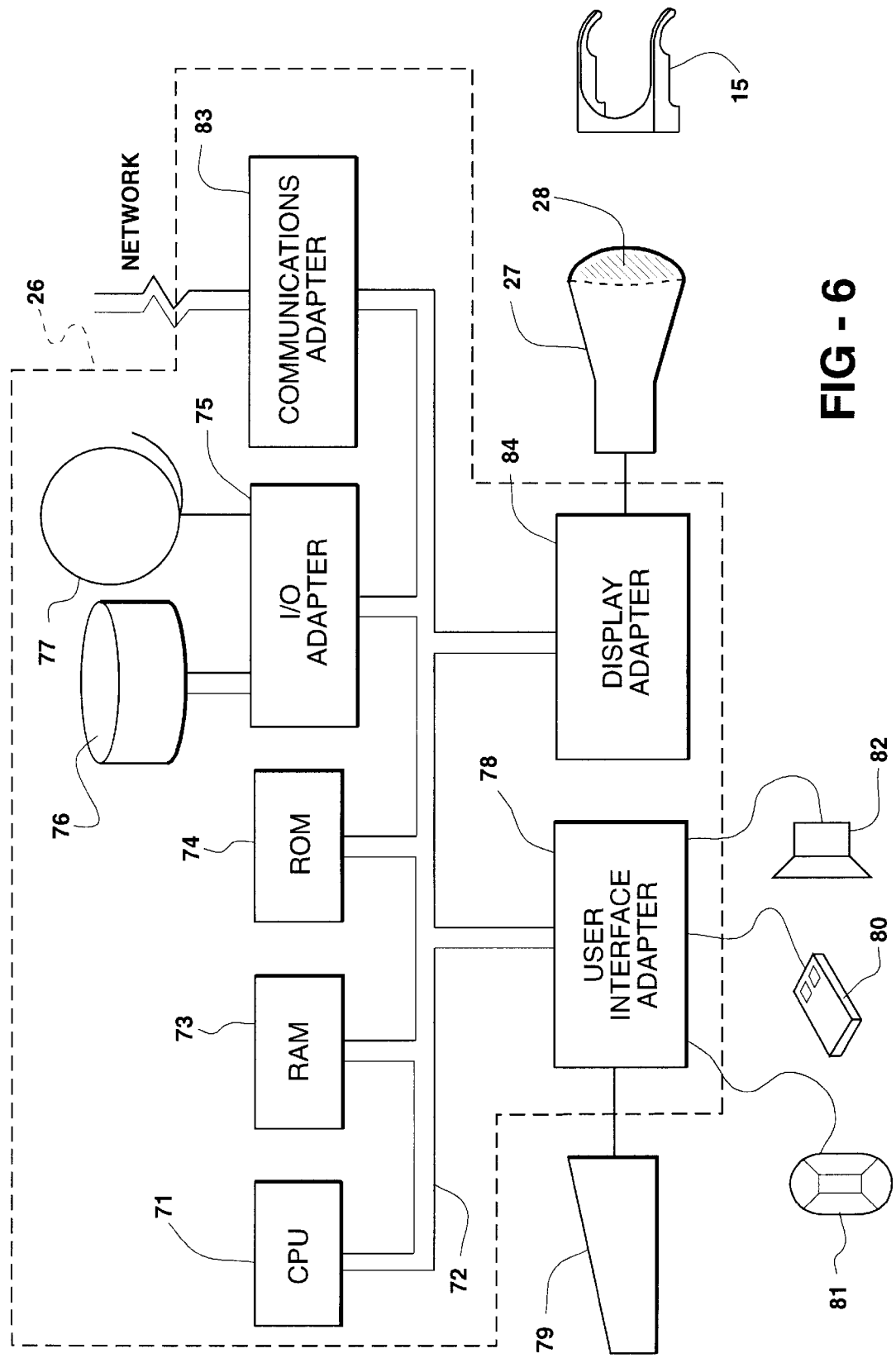
FIG. 6 is a detailed block diagram of the system depicted in FIG. 5 according to a preferred embodiment of the present invention.

Referring now to FIG. 6, a detailed block diagram of an image viewing system, such as the combination of computer 26 and monitor 27, as depicted in FIG. 5 is shown. Reference numerals or letters in FIG. 6 which are like, similar, or identical to the reference numerals or letters of FIGS. 1–5 indicate like, similar, or identical components or features. A computer 26, as in FIG. 5, comprises at least one central processing unit (CPU) 71. Wherein the CPU 71 is interconnected via a system bus or buses 72 to random-access memory (RAM) 73, read-only memory (ROM) 74, at least one input/output (I/O) adapter 75 for connecting peripheral devices such as disk units 76 and tape drives 77 to the system bus or buses 72, at least one user interface adapter 78 for connecting a keyboard 79, a pointing device 80, a microphone 81, a speaker 82, and/or other user interface device such as a touch screen device (not shown) to the system bus or buses 72, at least one communications adapter 83 for connecting the computer 26 to an information network such as the Internet, and at least one display adapter 84 for connecting the system bus or buses 72 to a display device or devices such as a monitor 27.

Figure 7:
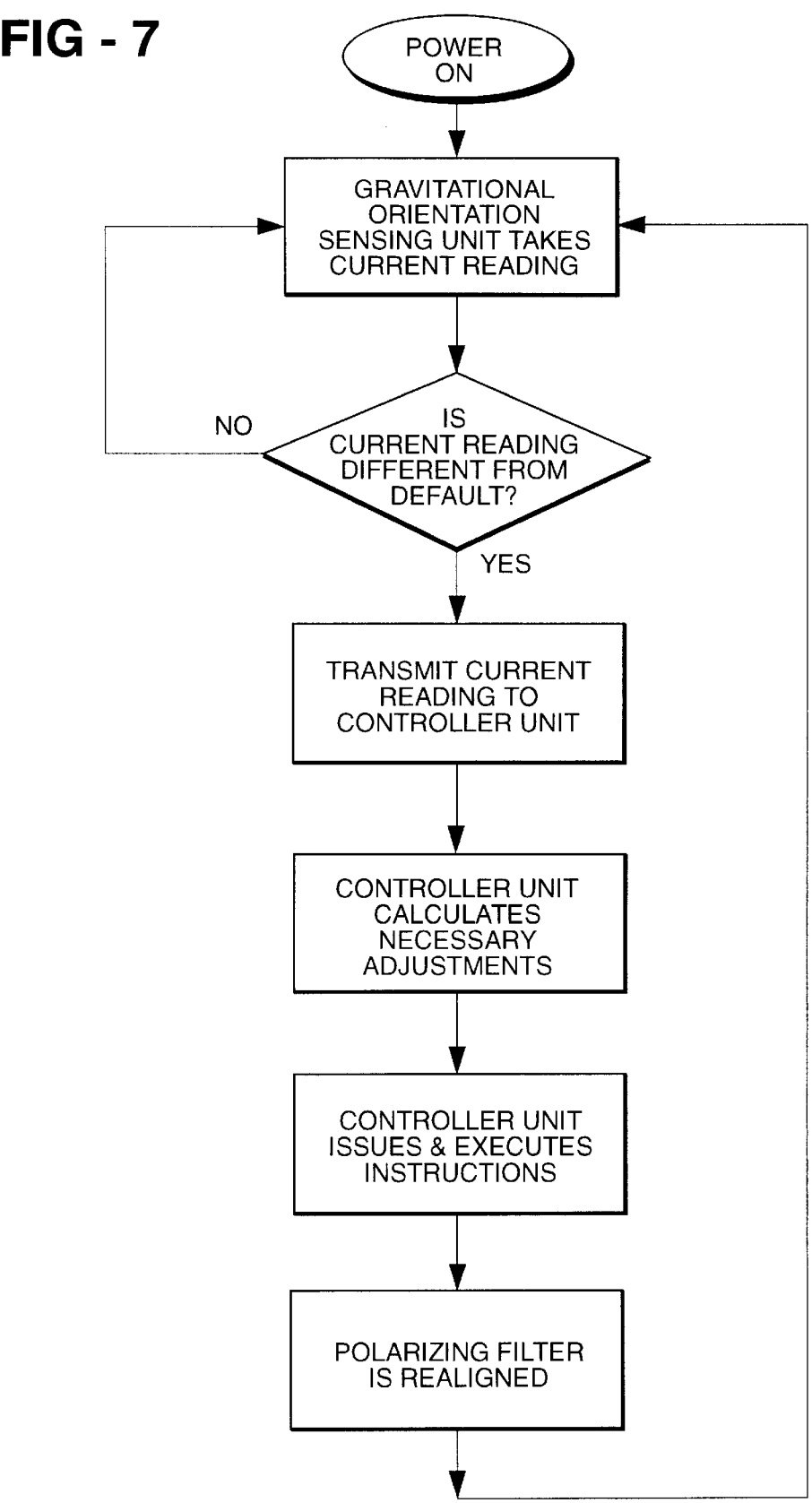
FIG. 7 is a flowchart illustrating a method according to the present invention.

Referring now to FIG. 7, a flowchart illustrating a method for adjusting the orientation of the LCD lenses according to the present invention is shown. The sensing unit 18 of the present invention can be implemented in a variety of ways, all of which operate on the same principle and methodology. By using either a tilt switch, an electronic gyroscope, an optical bubble level or similar device, movement of the eyeglass frames can be easily determined. Upon manufacture, a default setting, the horizontal plane, is established in the sensing unit 18. As the eyeglasses are being used, the gravitational orientation reading of the sensing unit 18 is being constantly monitored and compared to a default setting. Once a reading has been determined to be different from the default setting, a signal containing the value of the gravitational orientation reading is transmitted to the controlling unit 17. Once this signal has been transmitted from the sensing unit 18, a timeout is taken by the sensing unit 18 to give the controlling unit 17 time to complete the realignment of the LCD polarizing filters 16. For the best results and the quickest possible reactions to a user, the cycle of readings by the sensing unit 18 should be ongoing, limited only by the necessary evaluation time and the time required in the instance of a realignment. Alternatively, after an initial adjustment of the glasses with respect to the default setting, subsequent readings and adjustments can be optimized by comparing the current reading to the previous reading. By comparing the current reading to the previous reading, adjustment needs and therefore time can be reduced. Upon receipt of the signal from the sensing unit 18, the controlling unit 17 begins its work. The controlling unit 17 will first process the incoming signal and perform a calculation to determine what adjustment will need to be made to get the LCD polarizing filters 16 back in line with their default settings. Once the adjustment instructions are determined, the controlling unit 17 processes these instructions and the LCD polarizing filters 16 are realigned. For the best results, the sensing unit 18 should be taking a gravitational orientation reading of the eyeglass frame immediately after the controlling unit 17 has completed the realignment.

The methods mentioned above for the sensing unit's 18 determination of the eyeglass frame's orientation as well as the functionality of the controlling unit 17 are both readily adapted to a computer readable medium.

Alternate applications could include 3-D movie viewing in a theater or on a television. Still 3-D images could also be viewed with the image viewing glasses 15 should the user 30 desire.

Prior to the apparatus and method disclosed herein, image viewing glasses operating on the principle of polarized light had an inherent limitation. When using a previous version of image viewing glasses operating on the principle of polarized light, to maintain image integrity, the user was required to hold a particular orientation between the image being displayed 28 and the glasses being used. As the orientation between the viewing glasses and the image display 28 were skewed out of orthogonality, the image became blurred. Another result of this skewing has been noticed in gaming situations wherein one's enthusiasm inevitably leads to a repositioning of the head. This repositioning of the head again leads to a blurring effect and often reveals information the competing gamer intended on keeping clandestine.

Figure 8A:
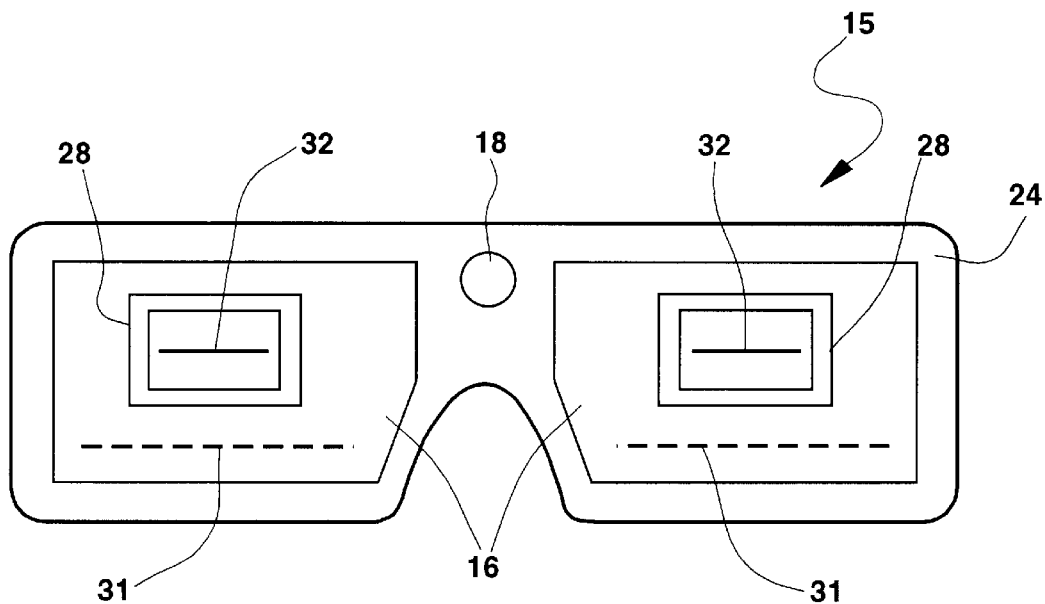
FIG. 8A is a front view of the apparatus of FIG. 1 showing a default orientation between the horizon line of the apparatus and the horizon line of the display according to a preferred embodiment of the present invention.
Figure 8B:
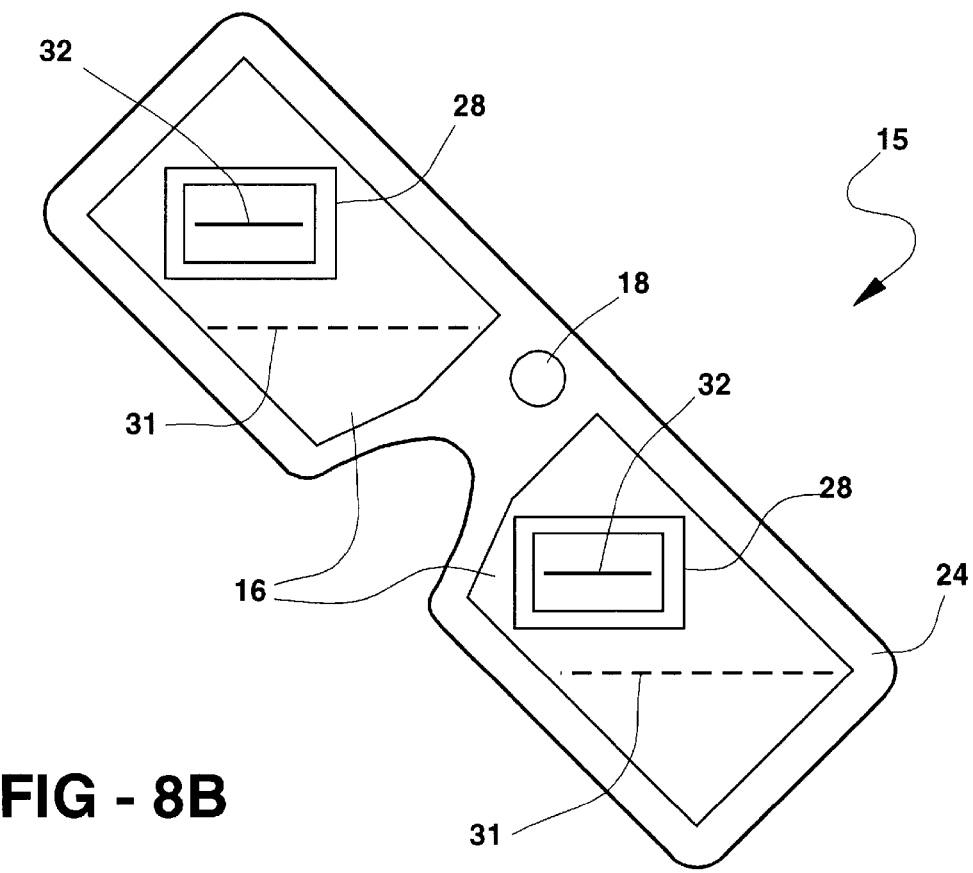
FIG. 8B is a front view of the apparatus of FIG. 1 showing a realignment of the horizon line of the apparatus, after tilting the apparatus, to the horizon line of the display according to a preferred embodiment of the present invention.

Referring now to FIG. 8A, a front view of the image viewing glasses of FIG. 1 at a default user orientation according to a preferred embodiment of the present invention is shown, and FIG. 8B, a front view of the image viewing glasses of FIG. 1 at a skewed orientation according to a preferred embodiment of the present invention is shown. Reference numerals or letters in FIG. 8A and 8B which are like, similar, or identical to the reference numerals or letters of FIGS. 1–7 indicate like, similar, or identical components or features. The apparatus and method disclosed herein have solved the problems incurred as a result of the natural head movements occurring during use. Any tilting of the head, and therefore tilting of the image viewing glasses 15, is detected by the sensing unit 18 included in the stabilizing bar 24 of the eyeglass frames of the image viewing glasses 15. Upon detection of a gravitational orientation change, an algorithm is executed by the controlling unit 17, included in the design, which readjusts the polarization of the LCD polarizing filters 16 back into alignment with a minimal delay, as in FIG. 8B. The result of the sensing unit 18 interacting with the controlling unit 17 interacting with the LCD polarizing filters 16, is that the image seen by the user 30 remains to be the image intended by the display 28 regardless of changes in the position or alignment of the image viewing glasses 15. FIG. 8A shows the correlation between the horizon line 32 of the display 28 and the horizon line 31 of the image viewing glasses 15 under normal viewing conditions. FIG. 8B shows the ideal response of the LCD polarizing filters 16 in order to maintain image integrity after a user 30 turns their head, in this example, to the right approximately 45 degrees. Notice that the horizon line 32 of the display 28 is still in parallel with the horizon line 31 of the image viewing glasses 15. This parallel alignment allows the light, and therefore the image, emitted from the display 28 to maintain an orthogonal course to the image viewing glasses 15.

By providing a means for communicating between the image viewing glasses 15 and the display 28, synchronizing can be accomplished. To enable the image viewing glasses 15 and the display 28 to be synchronized, a sensing unit similar to that of the image viewing glasses 15 is included in the display 28. When a user first begins to utilize the image viewing system, a communication between the image viewing glasses 15 and the display 28 occurs. An algorithm is then executed which causes the horizon line of both the image viewing glasses 15 and the display 28 to be aligned. This alignment results in a clearer image seen by the user of the system by ensuring that the light received by the image viewing glasses 15 arrives orthogonally. The present invention can be further enabled such that this horizon line alignment occurs periodically or as the result of depressing a task oriented button included on the image viewing glasses 15 frame.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random-access memory 73 of one or more computer or information handling systems configured generally as described in FIGS. 1–8B. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

I claim:

1. An apparatus for viewing an image comprising:
   at least one polarizing filter;
   a sensor configured to detect an orientation of said filter; and
   a controller operably coupled to said sensor and said filter and configured to adjust polarization of said filter in response to said orientation detected by said sensor.

2. The apparatus as recited as in claim 1, wherein said controller is operably coupled to said filter to adjust polarization of said filter in response to said orientation detected by said sensor.

3. The apparatus as recited in claim 1, wherein said sensor is configured to detect orientation of said filter in response to a gravitational force.

4. The apparatus as recited in claim 1, further comprising eye-ware including said polarizing filter and said sensor.

5. The apparatus as recited in claim 4, wherein said eyeware includes said controller.

6. The apparatus as recited in claim 1, further comprising a power source configured to provide power to said filter, said controller and said sensor.

7. An image viewing system comprising:

an image generator configured to project an image;

at least one polarizing filter configured to receive and filter an image;

a sensor configured to detect an orientation of said filter; and a controller operably coupled to said sensor and said filter and configured to adjust polarization of said filter in response to said orientation detected by said sensor.

8. The image viewing system as recited in claim 7, wherein said controller is operably coupled to said filter to adjust polarization of said filter in response to said orientation detected by said sensor.

9. The image viewing system as recited in claim 7, wherein said sensor is configured to detect orientation of said filter in response to a gravitational force.

10. The image viewing system as recited in claim 7, further comprising eyeware including said polarizing filter and said sensor.

11. The image viewing system as recited in claim 10, wherein said eyeware includes said controller.

12. The image viewing system as recited in claim 7, further comprising a power source configured to provide power to said filter, said sensor and said controller.

13. A method for adjusting polarization of a polarizing filter, said method comprising the steps of:

determining a current orientation of the filter; and adjusting the polarization of the filter in response to the current orientation of the filter.

14. The method as recited in claim 13, wherein said determining step is performed by a sensor configured to detect the current orientation of the filter in response to a gravitational force.

15. The method as recited in claim 13, wherein said adjusting step is performed by a controller configured to adjust polarization of the polarizing filter.

16. The method as recited in claim 15, further comprising the steps of:

comparing the current orientation of said filter to a default orientation; and adjusting the polarization of the filter based upon the difference between the current orientation and the default orientation.

17. A computer readable medium tangibly embodying a program of instructions for adjusting polarization of a polarizing filter, said program of instructions implementing the following method:

determining a current orientation of the filter; and adjusting the polarization of the filter in response to the current orientation of the filter.

18. The computer readable medium as recited in claim 17, wherein said determining step is performed by a sensor configured to detect the current orientation of the filter in response to a gravitational force.

19. The computer readable medium as recited in claim 17, wherein said adjusting step is performed by a controller configured to adjust polarization of the polarizing filter.

20. The computer readable medium as recited in claim 17, further comprising the steps of:

comparing said current orientation to a default orientation; and adjusting the polarization of the filter based upon the difference between the current orientation and the default orientation.

* * * * *